United States Patent [19]

Amano et al.

[11] Patent Number: 5,153,284
[45] Date of Patent: Oct. 6, 1992

[54] PROCESS OF PRODUCING A VINYL CHLORIDE POLYMER

[75] Inventors: Tadashi Amano, Kawasaki; Shigehiro Hoshida, Kamisu, both of Japan

[73] Assignee: Shin-Etsu Chemical Co., Ltd., Tokyo, Japan

[21] Appl. No.: 526,994

[22] Filed: May 22, 1990

[30] Foreign Application Priority Data

May 22, 1989 [JP] Japan .................. 1-128145

[51] Int. Cl.$^5$ .............................................. C08F 2/20
[52] U.S. Cl. .................................... 526/200; 526/201; 526/202; 526/203
[58] Field of Search ............... 526/200, 201, 202, 203

[56] References Cited

U.S. PATENT DOCUMENTS

| | | | |
|---|---|---|---|
| 4,533,652 | 8/1985 | Tanaka | 502/167 |
| 4,757,092 | 7/1988 | Hawrylko | 526/203 |

*Primary Examiner*—Christopher Henderson
*Attorney, Agent, or Firm*—Oblon, Spivak, McClelland, Maier & Neustadt

[57] ABSTRACT

A process of producing a vinyl chloride polymer, comprising the step of suspension polymerizing vinyl chloride or a monomer mixture comprising mainly vinyl chloride in the presence of an oil-soluble polymerization initiator in an aqueous medium containing a dispersant, wherein said dispersant comprises:
(A) a partially saponified polyvinyl alcohol,
(B) a hydroxypropylmethyl cellulose, and
(C) a crosslinked polymer having a carboxyl group.

This process can produce a vinyl chloride polymer having a high bulk density and a high porosity and therefore capable of producing an extruded product with an extremely small amount of fish eyes, at high efficiency and high productivity.

5 Claims, No Drawings

PROCESS OF PRODUCING A VINYL CHLORIDE POLYMER

BACKGROUND OF THE INVENTION

1. Field of the Invention

The present invention relates to a process of producing a vinyl chloride polymer, in particular to a process of producing a vinyl chloride polymer having a high bulk density and a high porosity and therefore capable of producing an extruded product of high quality with an extremely small number of fish eyes, at high efficiency and high productivity.

2. Description of the Prior Art

Heretofore, in extruding a vinyl chloride polymer to form a rigid extrudate, a polymer with a high bulk density is required to enhance productivity, i.e., extrusion rate. On the other hand, high porosity is required for polymers so that the polymer may have good gelling properties and good plasticizer take up. Hence, various attempts have been so far made to produce a vinyl chloride polymer having a high bulk density as well as a high porosity. However, increase in bulk density and increase in porosity of a vinyl chloride polymer are in conflict with each other; therefore it has been extremely difficult to satisfy both requirements simultaneously.

Recently, to solve this problem, methods have been proposed in which a water-insoluble crosslinked polymer containing a carboxyl group and a nonionic surfactant are used as dispersants in polymerization of monomers such as vinyl chloride (Japanese Pre-examination Patent Publication (KOHYO) Nos. 500614/1982 and 500650/1982 and Japanese Pre-examination Patent Publication (KOKAI) Nos. 91205/1986 and 14204/1986).

However, the methods described in the Japanese Pre-examination Patent Publication (KOHYO) Nos. 500614/1982 and 500650/1982 can produce a polymer with a high bulk density to a certain extent, but can achieve a high porosity which is necessary to produce extrudates with no fish eyes, with difficulty. On the other hand, the methods described in the Japanese Pre-examination Patent Publication (KOKAI) Nos. 91205/1986 and 14204/1986 can produce polymers with a high bulk density and an increased porosity. However, in the case where the amount of monomers charged is increased or the polymerization time is shortened, the polymerization reaction becomes unstable, resulting in an agglomerated polymer; thus the methods have the problem that it is impossible to produce a vinyl chloride polymer of high quality in regard to bulk density, particle size distribution and the number of fish eyes in extruded products, at high efficiency and high productivity.

SUMMARY OF THE INVENTION

Accordingly, it is one object of the present invention to provide a process of producing a vinyl chloride polymer of high quality with a high bulk density and a high porosity and therefore unlikely to produce fish eyes in extruded products, at high efficiency and high productivity.

Thus, the present invention provides as a means achieving the above object a process of producing a vinyl chloride polymer, comprising the step of suspension polymerizing vinyl chloride or a monomer mixture comprising mainly vinyl chloride in the presence of an oil-soluble polymerization initiator in an aqueous medium containing a dispersant, wherein said dispersant comprises:

(A) a partially saponified polyvinyl alcohol,
(B) a hydroxypropylmethyl cellulose, and
(C) a crosslinked polymer having a carboxyl group.

According the process of the present invention, a vinyl chloride polymer of high quality with a high bulk density and a high porosity can be produced at high efficient and high productivity.

DETAILED DESCRIPTION OF PREFERRED EMBODIMENTS

Dispersant (A)

The dispersant (A), the partially saponified polyvinyl alcohol, is not particularly limited, including, for example, those having an average polymerization degree of from 150 to 2,600 and a saponification degree of from 20 to 90 mol %. More specifically, it includes water-soluble partially saponified polyvinyl alcohols having an average polymerization degree of from 700 to 2,600 and a saponification degree of from 60 to 90 mol %, and oil-soluble ones having an average polymerization degree of from 150 to 600 and a saponification degree of from 20 to 55 mol %. Among these, preferred are water-soluble partially saponified polyvinyl alcohols having an average polymerization degree of from 700 to 2,600 and a saponification degree of from 60 to 90 mole %.

Dispersant (B)

The dispersant (B), the hydroxypropylmethyl cellulose, is not particularly limited, including, for example, those having a methoxyl content of from 26 to 30% by weight, a hydroxypropoxyl content of from 4 to 15% by weight, and a viscosity at 20° C. of from 5 to 4,000 cP in the form of aqueous 2% by weight solution.

Dispersant (C)

The dispersant (C), the crosslinked polymer having a carboxyl group, is prepared by subjecting a polymerizable unsaturated carboxylic acid compound and a crosslinking agent to copolymerization with crosslinking in the presence of a suitable polymerization initiator. The crosslinking agent used includes, for example, compounds containing one or more polymerizable unsaturated ethylenically double bonds in the molecule, including aromatic compounds such as divinylbenzenes and divinyl-naphthalenes; soluble polymerizable diene compounds such as polybutadiene, ethylene glycol diacrylate, ethylene glycol dimethacrylate, allyl acrylate, methylene-bis(acrylamide), divinyl ether, and diallyl ether; polyallyl compounds such as pentaerythritol, mannitol, sorbitol, glucose, and saccharose; polyvinyl compounds; and compounds having the general formula (I):

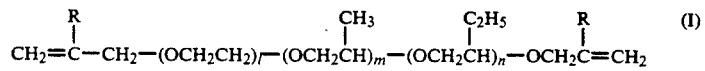

$$CH_2=\overset{R}{\underset{|}{C}}-CH_2-(OCH_2CH_2)_l-(OCH_2\overset{CH_3}{\underset{|}{CH}})_m-(OCH_2\overset{C_2H_5}{\underset{|}{CH}})_n-OCH_2\overset{R}{\underset{|}{C}}=CH_2 \quad (I)$$

wherein R represents a hydrogen atom or the methyl group; l, m and n are each an integer of from 2 to 200, and satisfy the equation: $0 < l+m+n \leq 500$, provided that the case where R represents a hydrogen atom, n is 0, and 1 +m is 1, is excluded. Examples of the compound of the general formula (I) include, for example, diethylene glycol bisallyl ether, diethylene glycol bismethally ether, and the compounds represented by the following formulas:

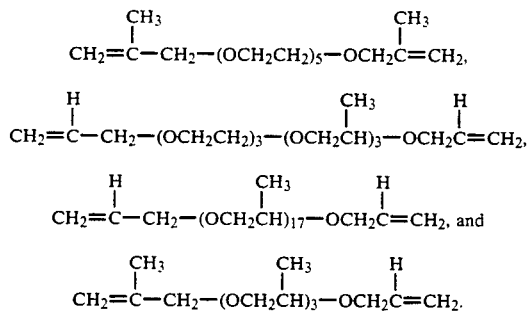

These compounds can be used singly or in combination of two or more.

The polymerizable unsaturated carboxylic acid compound includes, for example, acrylic acid, methacrylic acid, itaconic acid, chloroacrylic acid, cyanoacrylic acid, α-phenylacrylic acid, α-benzylacrylic acid, crotonic acid, maleic acid, fumaric acid, and sorbic acid. These compounds can be used singly or in combination of two or more.

The polymerization initiator used for preparation of the crosslinked polymer having a carboxyl group, the dispersant (C), includes initiators of azo compounds, peroxides, and redox compounds, for example, azobisisobutyronitrile, 2,2'-azobis(2,4-dimethyl-4-methoxyvaleronitrile), benzoyl peroxide, cumene hydroperoxide, tert-butyl hydroperoxide, persulfate, combination of persulfate and percarbonate, and combination of persulfate and sulfite.

Said copolymerization with crosslinking is normally carried out at a temperature of from 40° to 80° C. in a solvent such as benzene, toluene, n-hexane and ethyl acetate under an inert atmosphere such as nitrogen. The crosslinking agent can be charged into the polymerization system in various ways, e.g., (1) all of the crosslinking agent is charged before initiation of the polymerization, (2) a part of the crosslinking agent is charged before initiation of the polymerization, and the rest is charged during polymerization in portions, or (3) all of the crosslinking agent is charged during polymerization continuously or intermittently. In the case of (3), charging the crosslinking agent is preferably completed before convertion exceeds 70%. Among the above ways, preferred is the way in which all of the crosslinking agent is charged during polymerization continuously.

In the crosslinked polymer of the dispersant (C), the amount of the crosslinking agent is preferably in a range of from 0.05 to 10 parts by weight, more preferably from 0.1 to 5 parts by weight, per 100 parts by weight of the polymerizable unsaturated carboxylic acid compound. If the amount of the crosslinking agent is too small, crosslinking does not proceed sufficiently; whereas on the other hand, if too large, crosslinking proceeds excessively, so that the crosslinked polymer of (C) may not achieve dispersing effect desirably.

A preferred crosslinked polymer as the dispersant (C) is the crosslinked polymer composed of the crosslinking agent of said general formula (I) and a polymerizable unsaturated carboxylic acid compound. Particularly preferred are compounds composed of 100 parts by weight of acrylic acid and 0.05 to 10 parts by weight of diethylene glycol bisallyl ether and/or diethylene glycol bismethallyl ether.

The dispersant used in the present invention comprises the dispersants (A), (B) and (C) as described above. The dispersant (A) is preferably charged in an amount of from 0.002 to 0.1 parts by weight, more preferably from 0.003 to 0.08 parts by weight, per 100 parts by weight of the monomer charged inasmuch as the resulting polymer has a high bulk density and high porosity. The dispersant (B) is preferably charged in an amount of from 0.002 to 0.1 parts by weight, more preferably from 0.003 to 0.08 parts by weight, per 100 parts by weight of the monomer inasmuch as the polymer obtained has a narrow particle size distribution and a high bulk density. The dispersant (C) is preferably charged in an amount of 0.005 to 0.5 parts by weight, more preferably from 0.005 to 0.05 parts by weight, per 100 parts by weight of the monomer inasmuch as the polymer obtained has a narrow particle size distribution and a high bulk density.

Oil-soluble polymerization initiator

The oil-soluble polymerization initiator used in the process of the present invention may be any of those conventionally used for polymerization of vinyl chloride or a monomer mixture mainly comprising vinyl chloride, which can be used with no limitation. Such initiators include, for example, organic peroxides such as diisopropyl peroxydicarbonate, di-2-ethylhexyl peroxydicarbonate, acetylcyclohexylsulfonyl peroxide, tert-butyl peroxypivalate, benzoyl peroxide, and lauroyl peroxide; and azo compounds such as azobisisobutyronitrile, azobis-2,4-dimethylvaleronitrile, and azobis-2,4-dimethoxy-2,4-dimethylvaleronitrile. These initiators may be used singly or in combination of two or more.

The oil-soluble polymerization initiator may be also used in an amount as conventionally adopted in polymerization of vinyl chloride or a monomer mixture mainly containing vinyl chloride in an aqueous medium. Normally, it is used in an amount of from about 0.01 to 5 parts by weight per 100 parts by weight of the monomer charged.

Monomers other than vinyl chloride which may be polymerized in the present process include, for example, vinyl esters such as vinyl acetate and vinyl propionate; acrylic acid and methacrylic acid, or esters or salts of these; maleic acid or fumaric acid, and esters or anhydrides thereof; aromatic vinyl compounds such as styrene, α-methylstyrene; unsaturated nitrile compounds such as acrylonitrile; halogenated vinylidenes such as fluorovinylidene and chlorovinylidene; olefins such as ethylene and propylene. These monomers may be used singly or in combination of two or more, and normally are used in an amount of less than 50% by weight of the monomer mixture.

Other polymerization conditions may be any of those as conventionally adopted in suspension polymerization of vinyl chloride or a monomer mixture mainly containing vinyl chloride. For example, water is used in an amount of 100 to 500 parts by weight per 100 parts by eight of the monomer. Polymerization is carried out at a temperature of from 35° to 80° C. Additives conventionally used may be optionally charged to the polymerization system as required, for example, polymerization modifiers, chain transfer agents, pH adjustors, gellation improvers, antistatic agents, etc.

EXAMPLES

The present invention will now be described in more detail with reference to working examples and comparative examples.

EXAMPLE 1

A stainless steel polymerization vessel with an inner volume of 1,000 liter was charged with 52 kg of deionized water, 15 g of a partially saponified polyvinyl alcohol (average polymerization degree: 2,550, saponification degree: 80 mol %), 15 g of a hydroxypropylmethyl cellulose (methoxyl content: 29% by weight, hydroxypropoxyl content: 10% by weight, viscosity at 20° C. of aqueous 2% by weight solution: 50 cP), 7.6 g of a crosslinked polymer composed of 100 parts by weight of acrylic acid and 1 part by weight of diethylene glycol bisallyl ether, and 30 g of a polymerization initiator, di-2-ethylhexyl peroxydicarbonate. After the inside of the polymerization was evacuated, 38 kg of vinyl chloride was charged. The reaction mixture was heated up to 57° C. with stirring, thereby polymerization being initiated. When the inner pressure of the polymerization vessel became 6.0 kg/cm$^2$.G, polymerization was terminated. Then, unreacted monomer was recovered, and the polymer slurry was taken out of the polymerization vessel, followed by dehydration and drying to give a granular vinyl chloride polymer.

The bulk density of the vinyl chloride polymer obtained was measured. The polymer was subjected to sieve analysis, and underside distribution as given in Table 1 was thereby obtained. Take up of plasticizer (DOP) of the polymer, and number of fish eyes in a extruded sheet from the polymer were measured by the methods below. The results are given in Table 1.

Take up of plasticizer

To 10 g of a polymer is added 20 g of DOP. After the polymer is allowed to stand for 1 hour, DOP which has not been absorbed is removed from the polymer by a centrifugal separator, and the amount thereof is measured, from which take up (% by weight) of DOP is calculated.

Number of fish eyes

With 50 g of a polymer are mixed 25 g of DOP, 0.3 g of tribasic lead sulfate, 1.0 g of lead stearate, 0.01 g of titanium oxide, and 0.005 g of carbon black, and the resulting mixture is allowed to stand for 30 minutes. Thereafter, the mixture is kneaded with rolls at 140° C. for 7 minutes, and then extruded into a sheet 0.2 mm thick. The number of fish eyes per 100 cm$^2$ of the sheet is measured.

EXAMPLE 2

A polymer was prepared in the same manner as in Example 1, except that the crosslinked polymer used was replaced with another crosslinked polymer composed of 100 parts by weight of acrylic acid and 2 parts by weight of diethylene glycol bismethallyl ether. The polymer obtained was measured for bulk density, undersize distribution, take up of plasticizer, and number of fish eyes in the same manner as in Example 1. The results are given in Table 1.

EXAMPLE 3

A polymer was prepared in the same manner as in Example 1, except that the crosslinked polymer used was replaced with a crosslinked polymer composed of 100 parts by weight of acrylic acid and 2 parts by weight of diethylene glycol bisallyl ether. The polymer obtained was measured for bulk density, undersize distribution, take up of plasticizer, and number of fish eyes in the same manner as in Example 1. The results are given in Table 1.

EXAMPLE 4

A polymer was prepared in the same manner as in Example 1, except that the crosslinked polymer used was replaced with a crosslinked polymer composed of 100 parts by weight of acrylic acid and 3 parts by weight of diethylene glycol bisallyl ether. The polymer obtained was measured for bulk density, undersize distribution, take up of plasticizer, and number of fish eyes in the same manner as in Example 1. The results are given in Table 1.

EXAMPLE 5

A polymer was prepared in the same manner as in Example 1, except that the partially saponified polyvinyl alcohol used was replaced with 25 g of another partially saponified polyvinyl alcohol with an average polymerization degree of 750 and a saponification degree of 72.3 mol % and that the amount of the hydroxypropylmethyl cellulose was changed to 5 g. The polymer obtained was measured for bulk density, undersize distribution, take up of plasticizer, and number of fish eyes in the same manner as in Example 1. The results are given in Table 1.

COMPARATIVE EXAMPLE 1

A polymer was prepared in the same manner as in Example 1, except that no crosslinked polymer was used. The polymer obtained was measured for bulk density, undersize distribution, take up of plasticizer, and number of fish eyes in the same manner as in Example 1. The results are given in Table 1.

COMPARATIVE EXAMPLE 2

A stainless steel polymerization vessel with an inner volume of 1,000 liter was charged with 52 kg of deionized water, 38 g of a crosslinked polymer composed of 100 parts by weight of acrylic acid and 2 parts by weight of ethylene glycol diacrylate, 38 g of sorbitan monolaurate, and 30 g of a polymerization initiator, di-2-ethylhexyl peroxydicarbonate. After the inside of the polymerization vessel was evacuated to an internal pressure of 50 mmHg, 38 kg of vinyl chloride was charged. The reaction mixture was heated up to 57° C. with stirring, thereby polymerization being initiated. When the inner pressure of the polymerization vessel became 6.0 kg/cm$^2$.G, polymerization was terminated. Then, unreacted monomer was recovered, and the polymer slurry was taken out of the polymerization vessel, followed by dehydration and drying to give a polymer.

The polymer obtained was in the state of agglomerate. Hence, none of bulk density, undersize distribution, take up of plasticizer and number of fish eyes could not be measured.

COMPARATIVE EXAMPLE 3

A polymer was prepared in the same manner as in Example 1, except that 25 g of a partially saponified polyvinyl alcohol with an average polymerization degree of 2,550 and a saponification degree of 88 mol % and 10 g of the hydroxypropylmethyl cellulose as used in Example 1 only were used as a dispersant, and no crosslinked polymer was used. The polymer obtained was measured for bulk density, undersize distribution, take up of plasticizer, and number of fish eyes in the same manner as in Example 1. The results are given in Table 1.

(A): 0.002 to 0.1 parts by weight,
(B): 0.002 to 0.1 parts by weight, and
(C): 0.005 to 0.5 parts by weight.

2. The process according to claim 1, wherein the dispersant (C) is a crosslinked polymer prepared by subjecting a crosslinking agent having the general formula (I):

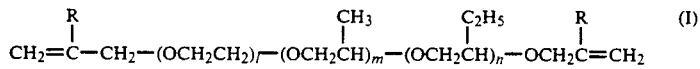

$$CH_2=\overset{R}{\underset{|}{C}}-CH_2-(OCH_2CH_2)_l-(OCH_2\overset{CH_3}{\underset{|}{CH}})_m-(OCH_2\overset{C_2H_5}{\underset{|}{CH}})_n-OCH_2\overset{R}{\underset{|}{C}}=CH_2 \quad (I)$$

wherein R represents a hydrogen atom or the methyl group; l, m and n are each an integer of from 2 to 200, and satisfy the equation: $0 < l+m+n \leq 500$, provided that the case where R represents a hydrogen atom, n is 0, and $l+m$ is 1, is excluded, and a polymerizable unsaturated carboxylic acid compound to copolymerization with crosslinking.

3. The process according to claim 2, wherein the crosslinked polymer is a compound composed of 100 parts by weight of acrylic acid and 0.05 to 10 parts by weight of at least one member selected from the group consisting of diethylene glycol bisallyl ether and diethylene glycol bismethallyl ether.

4. The process according to claim 1, wherein the monomer mixture further comprises at least one member selected from the group consisting of vinyl esters; acrylic acid and methacrylic acid, and esters and salts thereof; maleic acid and fumaric acid, and esters and anhydrides thereof; aromatic vinyl compounds; unsaturated nitrile compounds; halogenated vinylidenes; and olefins.

5. The process according to claim 1, wherein the oil-soluble polymerization initiator is used in an amount of 0.01 to 5 parts by weight per 100 parts by weight of the monomer.

TABLE 1

|  | Examples | | | | | Comparative Examples | | |
|---|---|---|---|---|---|---|---|---|
|  | 1 | 2 | 3 | 4 | 5 | 1 | 2 | 3 |
| Bulk density | 0.57 | 0.56 | 0.56 | 0.55 | 0.56 | 0.50 |  | 0.55 |
| Undersize distribution of particles (%) |  |  |  |  |  |  |  |  |
| 60 mesh undersize* | 100 | 100 | 100 | 100 | 100 | 100 | Agglomerated polymer formed. | 100 |
| 80 mesh undersize | 72.5 | 82.1 | 85.6 | 80.0 | 70.1 | 89.9 | | 74.5 |
| 100 mesh undersize | 21.2 | 24.0 | 27.3 | 23.2 | 20.8 | 72.3 | | 22.8 |
| 150 mesh undersize | 9.8 | 10.0 | 11.1 | 9.9 | 9.6 | 17.4 |  | 10.0 |
| 200 mesh undersize | 0.5 | 0.7 | 0.8 | 0.6 | 0.5 | 2.1 |  | 0.7 |
| Take up of plasticizer (% by weight) | 23.0 | 22.5 | 23.0 | 23.5 | 23.0 | 23.5 |  | 17.5 |
| Number of fish eyes (per 100 cm²) | 2 | 2 | 3 | 2 | 2 | 3 |  | 150 |

*Remarks: Sieve defined in JIS Z-8801

What is claimed is:

1. A process for producing a vinyl chloride polymer, comprising the step of suspension polymerizing vinyl chloride in the presence of an oil-soluble polymerization initiator in an aqueous medium containing a dispersant, wherein said dispersant comprises:
   (A) a water-soluble partially saponified polyvinyl alcohol with an average polymerization degree of from 700 to 2,600 and a saponification degree of from 60 to 90 mol %;
   (B) a hydroxypropylmethyl cellulose having a methoxyl content of from 26 to 30% by weight, a hydroxypropyl content of from 4 to 15% by weight, and a viscosity at 20° C. of from 5 to 4,000 cP in the form of aqueous 2% by weight solution; and
   (C) a crosslinked polymer having a carboxyl group;
wherein the dispersants (A), (B) and (C) are used in amounts below per 100 parts by weight of the monomer: